(12) United States Patent
Huang et al.

(10) Patent No.: US 9,225,196 B2
(45) Date of Patent: Dec. 29, 2015

(54) RECTIFYING-AND-MODULATING CIRCUIT AND WIRELESS POWER RECEIVER INCORPORATING THE SAME

(71) Applicant: RICHTEK TECHNOLOGY CORP., Chupei, Hsinchu (TW)

(72) Inventors: Wei-Jen Huang, New Taipei (TW); Tsung-Wei Huang, Taipei (TW); Shui-Mu Lin, Taichung (TW)

(73) Assignee: RICHTEK TECHNOLOGY CORP., Hsinchu County (TW)

( * ) Notice: Subject to any disclaimer, the term of this patent is extended or adjusted under 35 U.S.C. 154(b) by 39 days.

(21) Appl. No.: 13/970,331

(22) Filed: Aug. 19, 2013

(65) Prior Publication Data

US 2014/0344601 A1 Nov. 20, 2014

(30) Foreign Application Priority Data

May 14, 2013 (TW) .............................. 102117020 U

(51) Int. Cl.
*H03C 1/54* (2006.01)
*H02J 7/02* (2006.01)
*G06F 1/32* (2006.01)
*H02M 1/42* (2007.01)
*H02M 5/45* (2006.01)
*H02M 3/335* (2006.01)
*H02M 3/158* (2006.01)
*H02M 5/458* (2006.01)

(52) U.S. Cl.
CPC .............. *H02J 7/025* (2013.01); *G06F 1/3293* (2013.01); *H02M 3/1588* (2013.01); *H02M 3/33592* (2013.01); *H02M 5/4505* (2013.01); *H02M 5/4585* (2013.01); *H02M 2001/4275* (2013.01)

(58) Field of Classification Search
CPC .................... H02M 2001/4275; H02M 3/1588; H02M 3/33592; H02M 5/4505; H02M 5/4585; G06F 1/3293; H02J 7/025
USPC ............. 363/21.06, 21.14, 37, 52, 67, 69, 70, 363/81, 84, 108; 307/107; 332/149, 172
See application file for complete search history.

(56) References Cited

U.S. PATENT DOCUMENTS 6,301,128 B1 * 10/2001 Jang et al. ........................ 363/17
7,518,886 B1 * 4/2009 Lai et al. ........................ 363/17

* cited by examiner

*Primary Examiner* — Richard Tan
(74) *Attorney, Agent, or Firm* — Osha Liang LLP

(57) ABSTRACT

A wireless power receiver includes a power receiving circuit wirelessly receiving power transmitted from a wireless power transmitter so as to generate an induced current, and a rectifying-and-modulating circuit including first to eighth switches and a control unit. The control unit is operable to control operation of each of the first to eighth switches between conduction and non-conduction. Accordingly, the first to fourth switches cooperatively constitute a full-bridge rectifier for rectifying the induced current generated by the power receiving circuit, and each of the fifth to eighth switches is operable to switch synchronously with a respective one of the first to fourth switches or to became non-conducting, thereby changing an amplitude of the induced current.

4 Claims, 4 Drawing Sheets

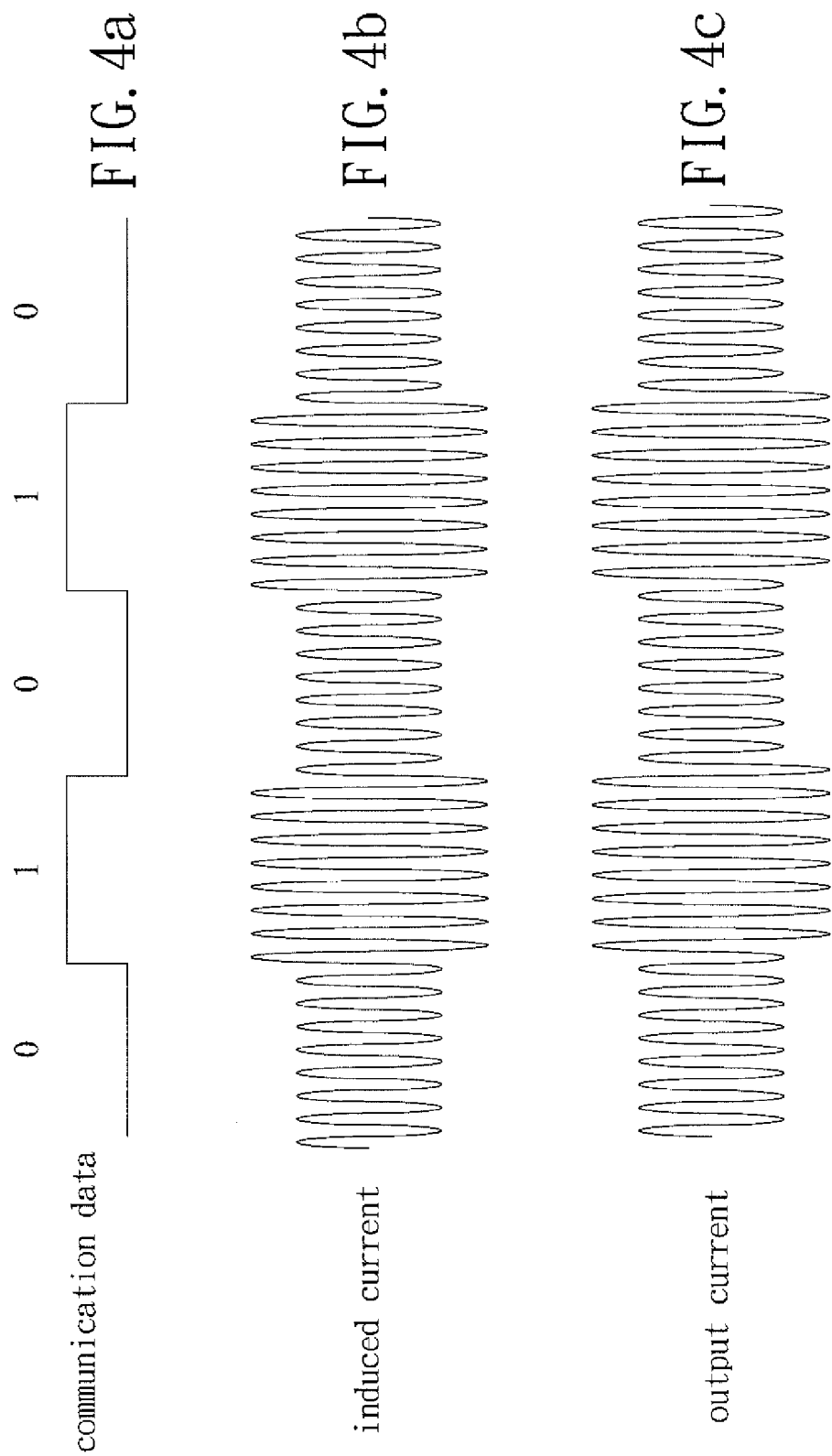

RECTIFYING-AND-MODULATING CIRCUIT AND WIRELESS POWER RECEIVER INCORPORATING THE SAME

CROSS-REFERENCE TO RELATED APPLICATION

This application claims priority of Taiwanese Application No. 102117020, filed on May. 14, 2013, the contents of which are hereby incorporated by reference.

BACKGROUND OF THE INVENTION

1. Field of the Invention

This invention relates to a wireless power receiver, and more particularly to a rectifying-and-modulating circuit and a wireless power receiver incorporating the same.

2. Description of the Related Art

Referring to FIG. 1, a conventional wireless power receiver can cooperate with a wireless power transmitter (not shown) to achieve power transfer and data communication. The conventional wireless power receiver includes a power receiving circuit 11, a full-bridge rectifier 12, a filtering capacitor 13, a modulating unit 14, two switches 15, and two modulating capacitors 16. The power receiving circuit 11 is used to wirelessly receive power transmitted from the wireless power transmitter so as to generate an induced current. The induced current generated by the power receiving circuit 11 is rectified by the full-bridge rectifier 12 and then, is filtered by the filtering capacitor 13. The modulating unit 14 is operable to control operation of each of the switches 15 between conduction and non-conduction based on communication data, thereby changing an amplitude of the induced current generated by the power receiving circuit 11 and thus changing an amplitude of an output current, which is generated by the wireless power transmitter for wirelessly transmitting the power to the conventional wireless power receiver. As a result, the wireless power transmitter can determine the communication data based on the change in the amplitude of the output current.

It is noted that the full-bridge rectifier 12, the modulating unit 14 and the switches 15 are generally integrated into an integrated circuit. Thus, the modulating capacitors 16 required to modulate the induced current generated by the power receiving circuit 11 are external to the integrated circuit, and occupy a relatively large area. In this case, the conventional wireless power receiver has a relatively high cost and occupies a relatively large area.

Moreover, since the full-bridge rectifier 12 is constituted by four diodes 121, the conventional wireless power receiver may have decreased power conversion efficiency. Referring to FIG. 2, in order to solve this problem, four N-channel metal oxide semiconductor field effect transistors (NMOSFETs) 122 are used to replace the diodes 121 of FIG. 1, and an additional rectifier control unit 17 is used to control operation of each of the NMOSFETs 122 between conduction and non-conduction. Upon start-up or light load operation of the conventional wireless power receiver, the rectifier control unit 17 is operable to control the NMOSFETs 122 to be non-conducting such that the induced current generated by the power receiving circuit 11 is rectified by parasitic diodes each formed between a bulk and a drain of a respective one of the NMOSFETs 122. Otherwise, each of the NMOSFETs 122 is controlled by the rectifier control unit 17 to alternately change between conduction and non-conduction so as to rectify the induced current generated by the power receiving circuit 11.

SUMMARY OF THE INVENTION

Therefore, an object of the present invention is to provide a rectifying-and-modulating circuit and a wireless power receiver incorporating the same that can overcome the aforesaid drawbacks of the prior art.

According to one aspect of this invention, a wireless power receiver comprises a power receiving circuit and a rectifying-and-modulating circuit. The power receiving circuit has first and second terminals, and is configured to wirelessly receive power transmitted from a wireless power transmitter so as to generate an induced current flowing through the first and second terminals. The rectifying-and-modulating circuit includes a series connection of first and second switches, a series connection of third and fourth switches, fifth to eighth switches, and a control unit. A first common node between the first and second switches is coupled to the first terminal of the power receiving unit. The series connection of the third and fourth switches is coupled to the series connection of the first and second switches in parallel. A second common node between the third and fourth switches is coupled to the second terminal of the power receiving unit. Each of the fifth to eighth switches is coupled to a respective one of the first to fourth switches in parallel. The control unit is coupled to the first to eighth switches. The control unit is operable to control operation of each of the first to eighth switches between conduction and non-conduction, so that the first to fourth switches cooperatively constitute a full-bridge rectifier for rectifying the induced current generated by the power receiving circuit, and so that each of the fifth to eighth switches is operable to switch synchronously with the respective one of the first to fourth switches or to become non-conducting, thereby changing an amplitude of the induced current.

According to another aspect of this invention, there is provided a rectifying-and-modulating circuit for a wireless power receiver that includes a power receiving circuit. The power receiving circuit has first and second terminals, and is operable to wirelessly receive power transmitted from a wireless power transmitter so as to generate an induced current flowing through the first and second terminals. The rectifying-and-modulating circuit of this invention comprises a series connection of first and second switches, a series connection of third and fourth switches, fifth to eighth switches, and a control unit. A first common node between the first and second switches is adapted to be coupled to the first terminal of the power receiving unit. The series connection of the third and fourth switches is coupled to the series connection of the first and second switches in parallel. A second common node between the third and fourth switches is adapted to be coupled to the second terminal of the power receiving unit. Each of the fifth to eighth switches is coupled to a respective one of the first to fourth switches in parallel. The control unit is coupled to the first to eighth switches. The control unit is operable to control operation of each of the first to eighth switches between conduction and non-conduction. Accordingly, the first to fourth switches cooperatively constitute a full-bridge rectifier for rectifying the induced current generated by the power receiving circuit, and each of the fifth to eighth switches is operable to switch synchronously with the respective one of the first to fourth switches or to become non-conducting, thereby changing an amplitude of the induced current.

BRIEF DESCRIPTION OF THE DRAWINGS

Other features and advantages of the present invention will become apparent in the following detailed description of the preferred embodiment of this invention, with reference to the accompanying drawings, in which:

FIGS. 4a to 4c are timing diagrams illustrating communication data and an induced current of the wireless power receiver of the preferred embodiment, and an output current of a wireless power transmitter, respectively.

DETAILED DESCRIPTION OF THE PREFERRED EMBODIMENT

Figure 3:
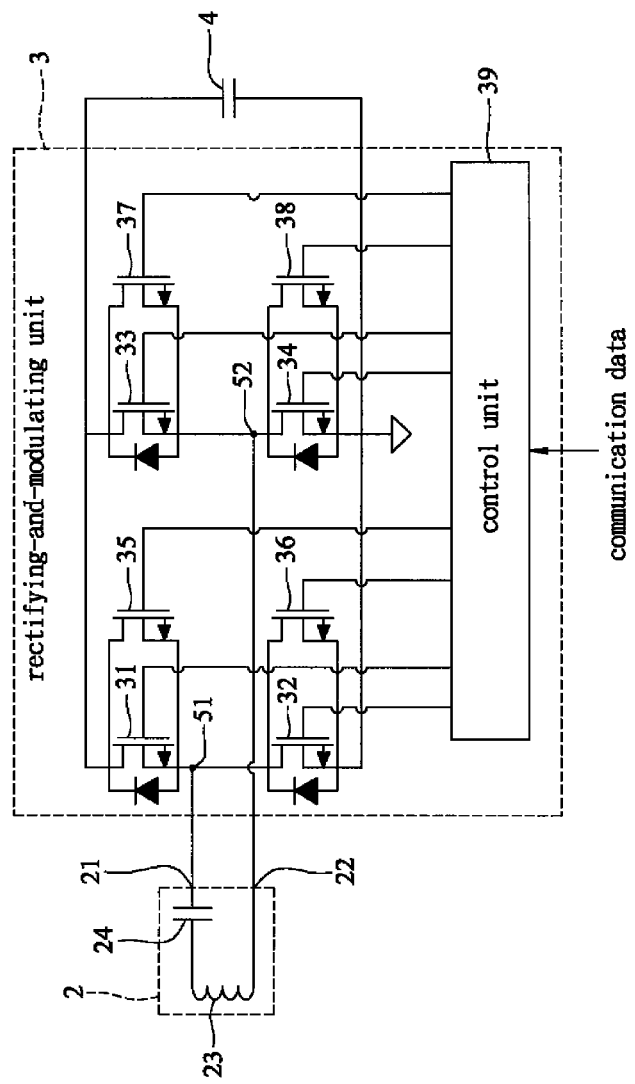
FIG. 3 is a schematic circuit diagram illustrating the preferred embodiment of a wireless power receiver according to this invention.

Referring to FIG. 3, the preferred embodiment of a wireless power receiver according to this invention is configured to cooperate with a wireless power transmitter (not shown) to achieve power transfer and data communication. The wireless power receiver of this embodiment includes a power receiving circuit 2, a rectifying-and-modulating circuit 3, and a filtering capacitor 4.

The power receiving circuit 2 has first and second terminals 21, 22, and is configured to wirelessly receive power transmitted from the wireless power transmitter so as to generate an induced current flowing through the first and second terminals 21, 22. In this embodiment, the power receiving circuit 2 includes a series connection of a coil 23 and a capacitor 24 coupled between the first and second terminals 21, 22.

The rectifying-and-modulating circuit 3 includes a series connection of first and second switches 31, 32, a series connection of third and fourth switches 33, 34, fifth to eighth switches 35-38, and a control unit 39.

A first common node 51 between the first and second switches 31, 32 is coupled to the first terminal 21 of the power receiving unit 2. The series connection of the third and fourth switches 33, 34 is coupled to the series connection of the first and second switches 31, 32 in parallel. A second common node 52 between the third and fourth switches 33, 34 is coupled to the second terminal 22 of the power receiving unit 2. Each of the fifth to eighth switches 35-38 is coupled to a respective one of the first to fourth switches 31-34 in parallel.

The control unit 39 is coupled to the first to eighth switches 31-38. The control unit 39 is operable to control operation of each of the first to eighth switches 31-38 between conduction and non-conduction. The first to fourth switches 31-34 cooperatively constitute a full-bridge rectifier for rectifying the induced current generated by the power receiving circuit 2 so as to generate a rectified signal. Each of the fifth to eighth switches 35-38 is operable, in response to communication data, to switch synchronously with the respective one of the first to fourth switches 31-34 or to become non-conducting, thereby changing an amplitude of the induced current and thus changing an amplitude of an output current, which is generated by the wireless power transmitter for wirelessly transmitting the power to the wireless power receiver. As a result, the wireless power transmitter can determine the communication data based on the change in the amplitude of the output current, and efficiency of power transmission from the wireless power transmitter to the wireless power receiver can be enhanced accordingly.

In this embodiment, each of the first to eighth switches 31-38 is an N-channel metal oxide semiconductor field effect transistor, and the rectifying-and-modulating circuit 3 is fabricated into a single integrated circuit. However, this invention is not limited to such configuration.

The filtering capacitor 4 is coupled to the series connection of the first and second switches 31, 32 and the series connection of the third and fourth switches 33, 34 in parallel, and is operable to filter the rectified signal that is generated by the full-bridge rectifier constituted by the first to fourth switches 31-34.

Referring to FIGS. 3 and 4a to 4c, it is assumed that each of the fifth to eighth switches 35-38 is controlled by the control unit 39 to be non-conducting when the communication data is '0', and to switch synchronously with the respective one of the first to fourth switches 31-34 when the communication data is '1'. An impedance seen from each of the first and second common nodes 51, 52 is relatively large when the communication data is '0', and is relatively small when the communication data is '1'. Accordingly, as shown in FIG. 4b, the amplitude of the induced current generated by the power receiving unit 2 is relatively small when the communication data is '0', and is relatively large when the communication data is '1' such that, as shown in FIG. 4c, the amplitude of the output current generated by the wireless power transmitter is relatively small when the communication data is '0', and is relatively large when the communication data is '1'. Therefore, the wireless power transmitter determines, based on the amplitude of the output current, that the communication data is '0' when the amplitude of the output current is relatively small and that the communication data is '1' when the amplitude of the output current is relatively large. Thus, the communication data can be determined by the wireless power transmitter based on the amplitude of the output current.

Figure 1:
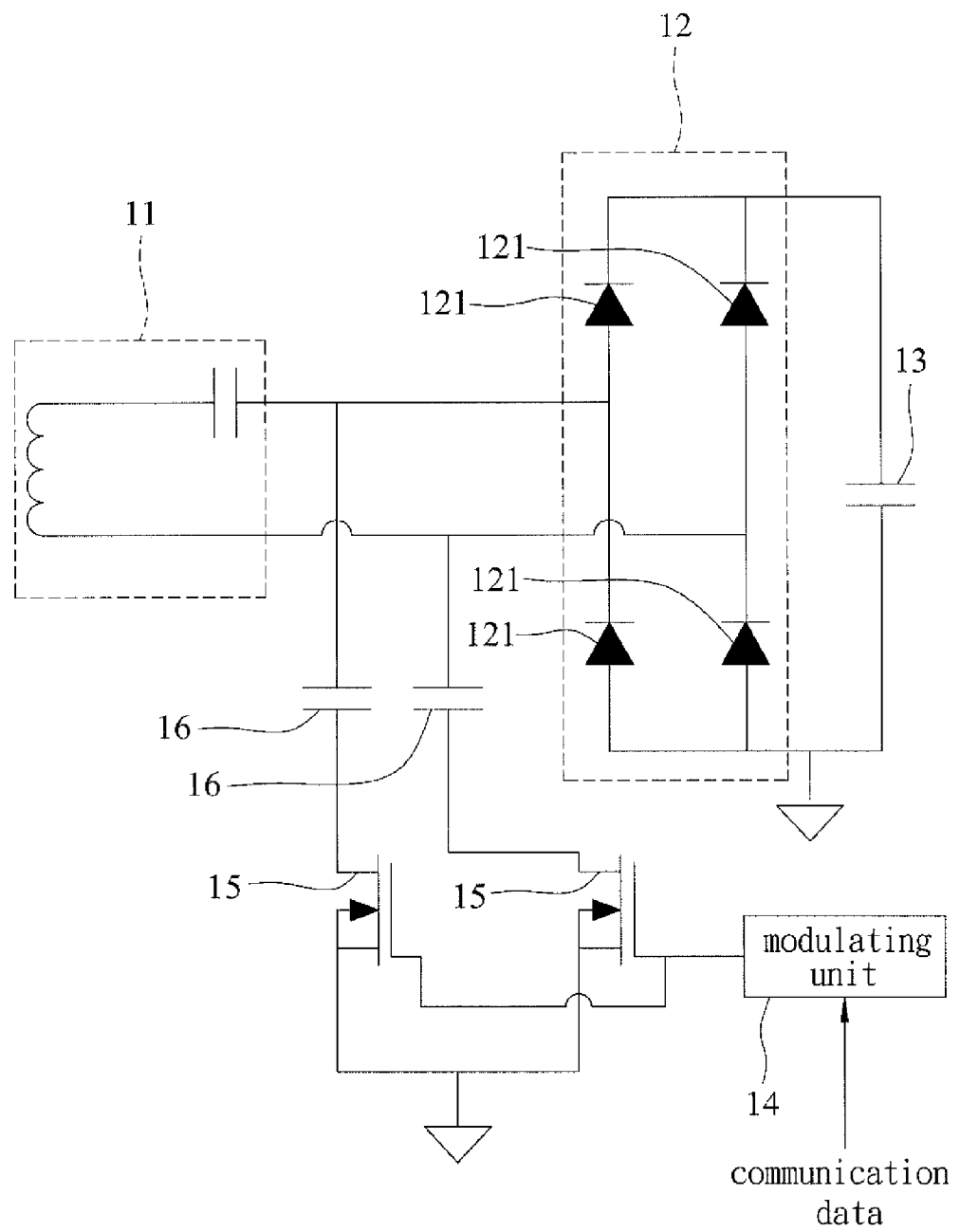
FIG. 1 is a schematic circuit diagram illustrating a conventional wireless power receiver.
Figure 2:
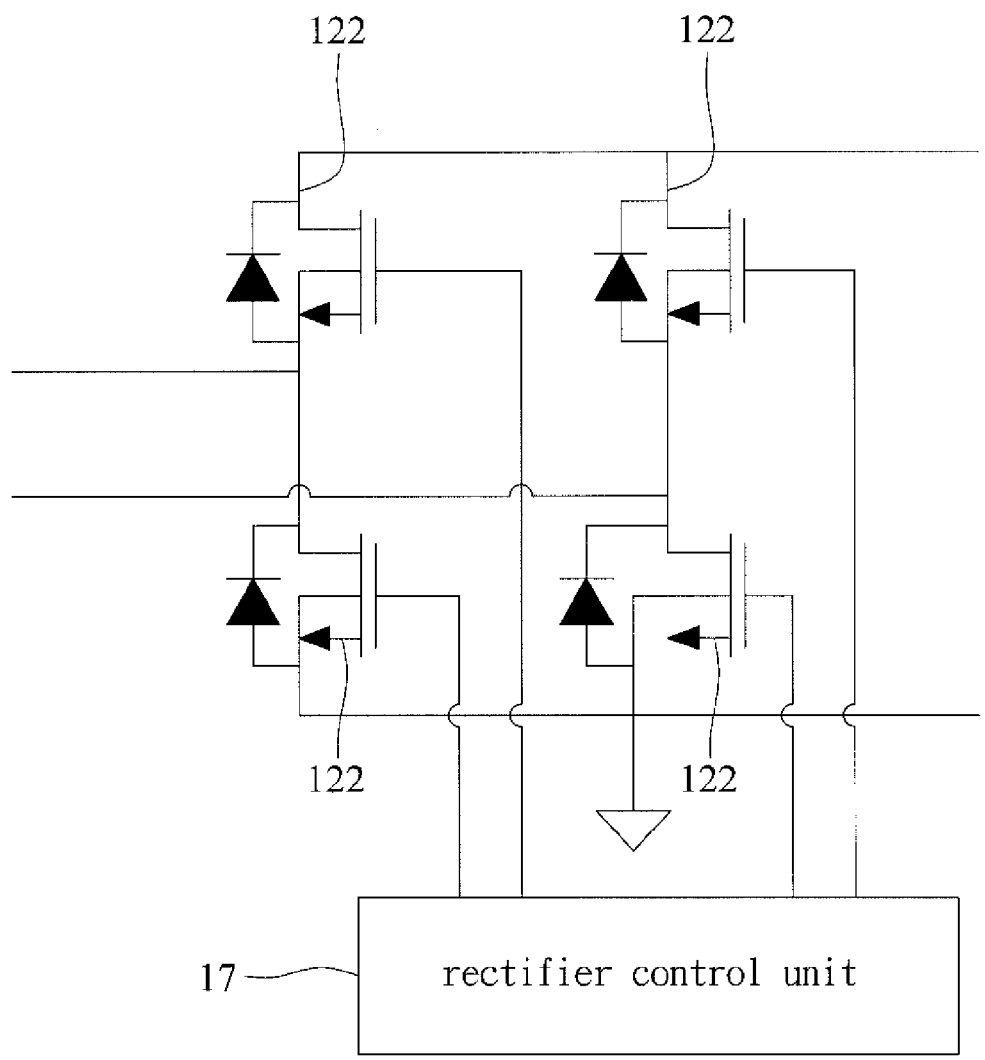
FIG. 2 is a schematic circuit diagram illustrating another configuration of a full-bridge rectifier of the conventional wireless power receiver.

In view of the above, by using the fifth to eighth switches 35-38, the wireless power receiver of this embodiment can omit the modulating capacitors 16 required by the conventional wireless power receiver of FIG. 1 to modulate the induced current. Therefore, the wireless power receiver of this embodiment has a relatively low cost and occupies a relatively small area particularly when the rectifying-and-modulating circuit 3 is in the form of the single integrated circuit. Moreover, since the first to fourth switches 31-34 of the rectifying-and-modulating circuit 3 have the same configuration and operation as those of the NMOSFETs 122 of FIG. 2, power conversion efficiency of the wireless power receiver of this embodiment can be improved compared to the conventional wireless power receiver of FIG. 1.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:
1. A wireless power receiver comprising:
a power receiving circuit having first and second terminals, and being configured to wirelessly receive power transmitted from a wireless power transmitter so as to generate an induced current flowing through said first and second terminals; and
a rectifying-and-modulating circuit comprising a series connection of first and second switches, a first common node between said first and second switches being coupled to said first terminal of said power receiving unit, a series connection of third and fourth switches coupled to the series connection of said first and second switches in parallel, a second common node between said third and fourth switches being coupled to said second terminal of said power receiving unit, fifth to eighth switches each coupled to a respective one of said first to fourth switches in parallel, and a control unit coupled to said first to eighth switches, wherein said control unit is operable to control operation of each of said first to eighth switches between conduction and non-conduction so that said first to fourth switches cooperatively constitute a full-bridge rectifier for rectifying the induced current generated by said power receiving circuit and so that each of said fifth to eighth switches is operable, in response to communication data to be transmitted from said wireless power receiver to the wireless power transmitter, to switch synchronously with the respective one of said first to fourth switches or to become non-conducting, thereby changing an amplitude of the induced current.

2. The wireless power receiver of claim 1, wherein each of said first to eighth switches of said rectifying-and-modulating circuit is an N-channel metal oxide semiconductor field effect transistor.

3. A rectifying-and-modulating circuit for a wireless power receiver that includes a power receiving circuit, the power receiving circuit having first and second terminals and being operable to wirelessly receive power transmitted from a wireless power transmitter so as to generate an induced current flowing through the first and second terminals, said rectifying-and-modulating circuit comprising:

a series connection of first and second switches, a first common node between said first and second switches being adapted to be coupled to the first terminal of the power receiving unit;

a series connection of third and fourth switches coupled to the series connection of said first and second switches in parallel, a second common node between said third and fourth switches being adapted to be coupled to the second terminal of the power receiving unit;

fifth to eighth switches each coupled to a respective one of said first to fourth switches in parallel; and a control unit coupled to said first to eighth switches, wherein said control unit is operable to control operation of each of said first to eighth switches between conduction and non-conduction so that said first to fourth switches cooperatively constitute a full-bridge rectifier for rectifying the induced current generated by the power receiving circuit and so that each of said fifth to eighth switches is operable, in response to communication data to be transmitted from said wireless power receiver to the wireless power transmitter, to switch synchronously with the respective one of said first to fourth switches or to become non-conducting, thereby changing an amplitude of the induced current.

4. The rectifying-and-modulating circuit of claim 3, wherein each of said first to eighth switches is an N-channel metal oxide semiconductor field effect transistor.

\* \* \* \* \*